United States Patent [19]
Bryant

[11] Patent Number: 4,686,819
[45] Date of Patent: Aug. 18, 1987

[54] MULCHER ATTACHMENT

[76] Inventor: Peter B. Bryant, 6785 Napier Street, Burnaby, British Columbia, Canada, V5B 2C5

[21] Appl. No.: 781,582

[22] Filed: Sep. 30, 1985

[51] Int. Cl.[4] .......................................... A01D 55/18
[52] U.S. Cl. .................................................... 56/295
[58] Field of Search ...................... 56/295, 13.6, 17.5; 30/349

[56] References Cited

U.S. PATENT DOCUMENTS

| | | | |
|---|---|---|---|
| 3,367,093 | 2/1968 | Zwickel | 56/400.04 |
| 3,402,542 | 9/1968 | Johnston | 56/295 |
| 3,683,606 | 8/1972 | Staines | 56/295 |
| 4,229,933 | 10/1980 | Bernard | 56/295 |
| 4,292,791 | 10/1981 | Lalonde | 56/295 |

FOREIGN PATENT DOCUMENTS 2949364 6/1981 Fed. Rep. of Germany ........ 56/295

Primary Examiner—Robert Peshock
Attorney, Agent, or Firm—Townsend & Townsend

[57] ABSTRACT

A rotary lawnmower has a motor, a drive shaft extending from the motor, a cutting blade with cutting edges and trailing edges being attached to the drive shaft to rotate with the shaft to cut grass. A housing surrounds the blade. There is a mulcher attachment fastened to the blade and shaped to provide deflectors to be spaced from the cutting portion of the blade. The deflectors comprising downwardly directed portions formed on the mulcher attachment adjacent the blade trailing edges. Cut grass from the blade is directed against the deflector portion and downwardly back in the grass as a mulch.

7 Claims, 11 Drawing Figures

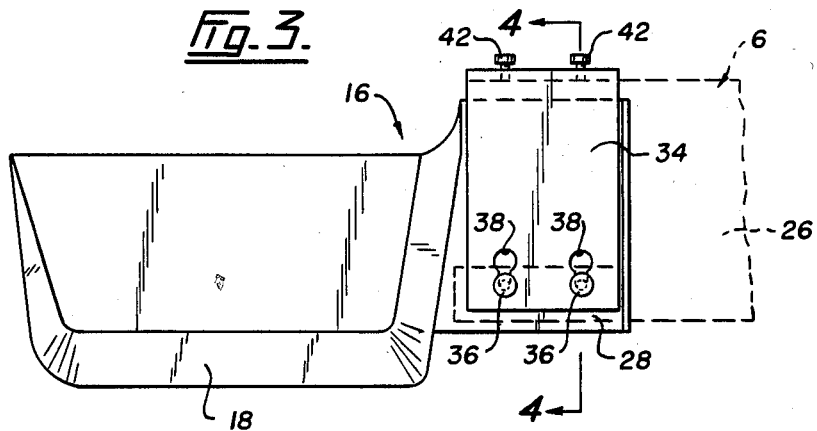
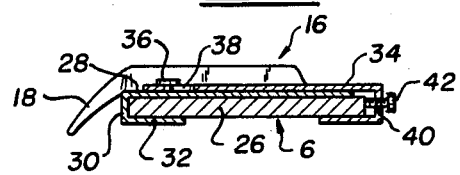
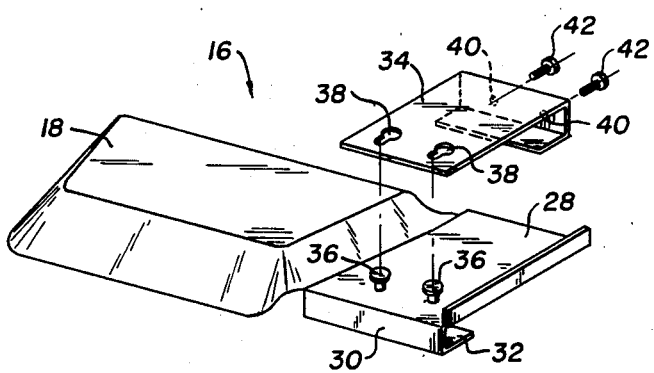

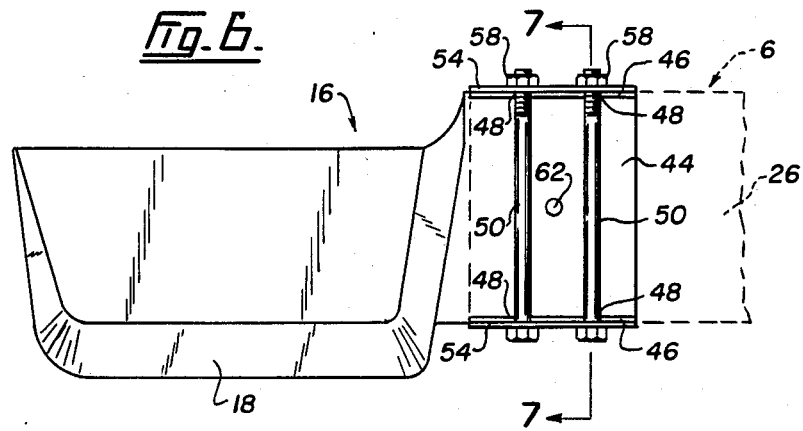
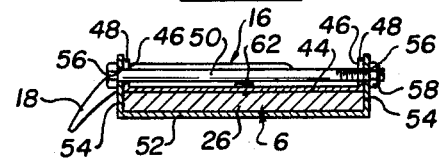
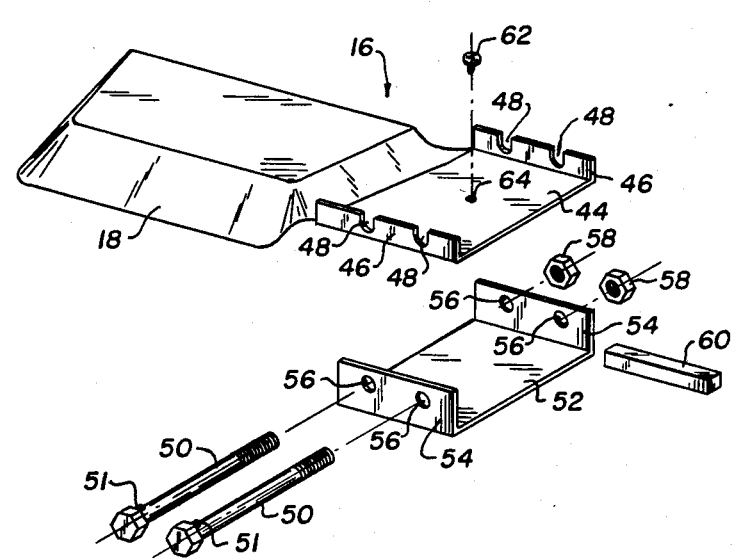

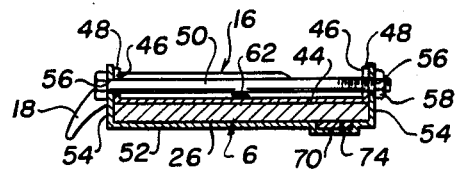
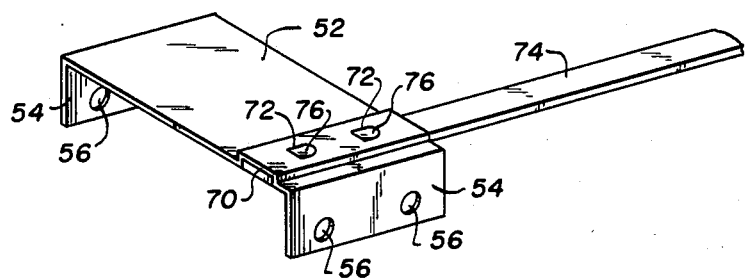
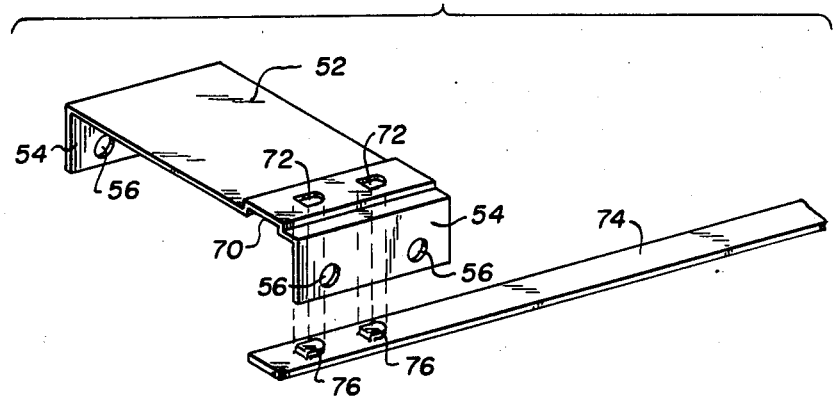

MULCHER ATTACHMENT

FIELD OF THE INVENTION

This invention relates to a mulcher attachment for a rotary lawnmower.

DESCRIPTION OF THE PRIOR ART

Rotary lawnmowers are well known. They comprise a motor, typically electric or gasoline, with a drive shaft extending from the motor. A cutting blade with a cutting edge and a trailing edge is attached to the drive shaft to rotate with the shaft to cut grass. A housing surrounds the blade. In many cases the housing is fitted with an outlet so that the grass cuttings can be directed from the housing through the outlet and into a bag. The cuttings are thus easily removed.

In a more recent type of rotary lawnmower the outlet is dispensed with. These mowers direct the cutting downwardly back into the grass where they form a mulch.

Mulching lawnmowers are desirable in that the nutrients in the grass are returned to the soil. The inconvenience of collecting cuttings and having to dispose of the cuttings is not present nor is the disadvantage of clogging, quite common in rotary lawnmowers having outlet chutes. Clogging is where the grass cuttings are so heavy or so wet that they block the outlet chute and the cuttings are then deposited in heaps on the ground, beneath the housing.

Examples of inventions relating to rotary lawnmowers having mulching capability are U.S. Pat. Nos. 2,641,100 to Sylvester; 2,091,906 to Hall; 4,205,512 to Thorud; 4,189,903 to Jackson; 4,450,673 to Hutchison; and 3,473,306 to Ewasko.

In general the commercially available mulching lawnmowers are expensive. Furthermore the above patents disclose mowers that are essentially mulching mowers, that is they are designed and built as mulching lawnmowers.

SUMMARY OF THE INVENTION

In contrast the present invention seeks to provide a mulcher attachment for a lawnmower in which a conventional, relatively cheap lawnmower, may easily be converted by the owner so that it becomes a mulching lawnmower.

Accordingly the present invention is in a rotary lawnmower comprising a motor, a drive shaft extending from the motor, a cutting blade with cutting edges and trailing edges, attached to the drive shaft to rotate with the shaft to cut grass, a housing surrounding the blade, and is the improvement comprising a mulcher attachment fastened to the blade and shaped to provide deflectors to be spaced from the cutting portion of the blade, the deflectors comprising downwardly directed portions formed on the mulcher attachment adjacent the blade trailing edges, whereby cut grass from the blade is directed against the deflector portion and downwardly back into the path of the cutting edge then into the grass as a mulch.

In one embodiment the mulcher attachment may be located on the drive shaft. Alternatively the attachment may be located on the blade by fastening means cooperating with the blade and with the mulcher attachment.

DRAWINGS

Aspects of the invention are illustrated, merely by way of example, in the accompanying drawings in which:

FIG. 3 is a partial plan view of a further embodiment of the present invention;

FIG. 4 is a section on the line 4—4 in FIG. 3;

FIG. 5 is a partial exploded view of the embodiment of FIG. 3;

FIG. 6 is a partial plan view of a further embodiment of the present invention;

FIG. 7 is a section on the line 7—7 in FIG. 6;

FIG. 8 is an exploded view of the embodiment of FIG. 6; and

FIGS. 9 to 11 show a safety feature useful with the attachment of the invention.

DESCRIPTION OF THE PREFERRED EMBODIMENTS

Figure 1:
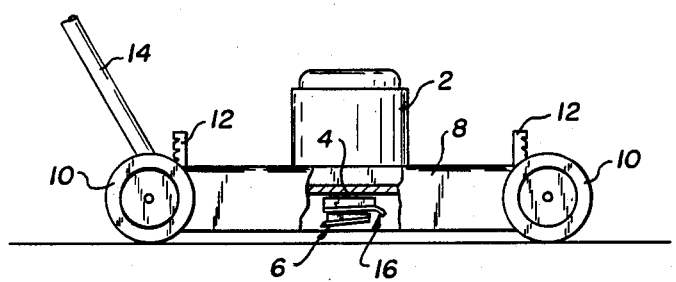
FIG. 1 is a general view of a lawnmower modified according to the present invention.

FIG. 1 shows a rotary lawnmower comprising a motor 2 and a drive shaft 4 extending from the motor 2. A cutter blade 6 is attached to the drive shaft 4 to rotate with the shaft to cut grass. Although not shown in FIG. 1 the blade has cutting and trailing edges. A housing 8 surrounds the blade to restrict the distance travelled by the cut grass. The lawnmower has conventional wheels 10, adjustable for height on columns 12, and handle 14. A mulcher attachment 16 is also shown.

According to the present invention the mulcher attachment 16 is fastened to the blade and shaped to provide deflectors to be spaced from the cutting portion of the blade. As shown particularly in FIG. 2 the deflectors comprise downwardly directed portions 18 formed on the mulcher attachment 16, adjacent the blade trailing edges 20, so that cut grass by the blade cutting edges 22 is directed against the deflector portions 18, as shown in FIG. 1, and downwardly, back into the path of the cutting edge then into the grass as mulch.

Figure 2:
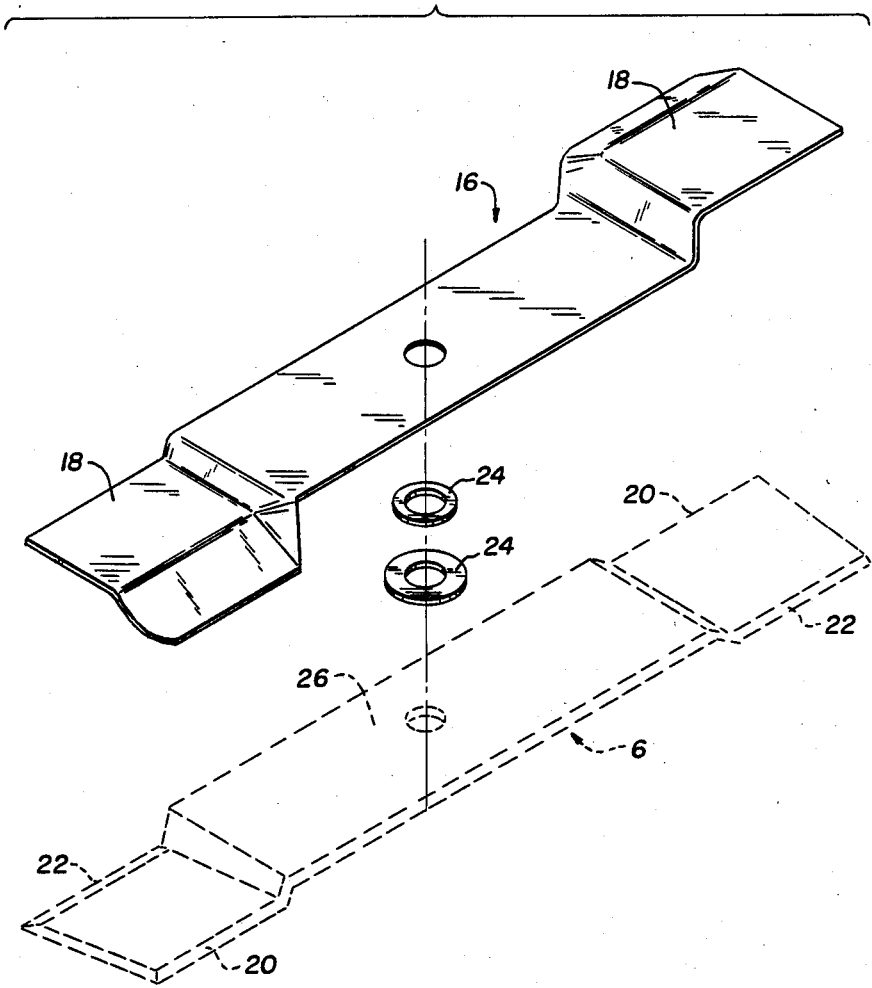
FIG. 2 is an exploded view of one embodiment of the present invention.

In FIGS. 1 and 2 the mulcher attachment is located on the drive shaft. The attachment is located simply by removing the bolt (not shown) that secures the blade 6, removing the blade, inserting the mulcher attachment 16, inserting spacer washers 24 then repositioning the blade and the nut. Blade 6, which is conventional, has a flat central area 26.

FIGS. 3 to 5 show a further embodiment of the mulcher attachment in which the attachment is located on the blade 6 by fastening means cooperable with the blade 6 and with the mulcher attachment. At least in part the attachment means comprise a separate component, separate that is from the blade and the mulcher attachment. However the embodiments of FIGS. 3 to 5 and of FIGS. 6 to 8 each have deflectors spaced from the cutting portion of the blade and each comprising downwardly directed portions formed on the mulcher attachment as described and shown in FIG. 2.

In the embodiment of FIGS. 3 to 5 there is a flat area 28 on the mulcher attachment able to attach to the flat central area 26 on the blade 6. A first bracket is formed at an edge of the central area 28 of the mulcher attachment and comprises a wall 30 projecting downwardly from the area 28 of the mulcher attachment 16 and a further wall 32 extending inwardly, generally parallel to the area 28. The walls 30 and 32 form first bracket means that are able to grip the central area 26 of the blade 6 as shown particularly in FIG. 4.

There is a second bracket 34 formed separately from the blade and from the mulcher attachment and adapted to be attached to the central area 26 of the blade 6 and to the area 28 of the mulcher attachment 16 by the provision of pegs 36 formed on the area 28 of the mulcher attachment 16. There are openings 38 in the second bracket 34 to receive and engage the pegs 36. Threaded openings 40 in the second bracket 34 permit the entry of screws 42 which contact an edge of the blade 6, again as most clearly shown in FIG. 4, and hold the mulcher attachment 16 in position. Two attachments are used for each blade, one for each end of the blade.

The openings 38 formed in the second bracket 34 are formed with a wider portion, to permit entry of the head of the peg 36, and narrow portions, communicating with the wider portions, to contact the stud of the pegs. Such an arrangement for ensuring location of a bracket on a peg is, of course, well known.

To use the mulcher attachment shown in FIGS. 3 to 5 the blade is removed and the mulcher attachment located on the blade using the first bracket formed by walls 30 and 32. The second bracket 34 is then positioned to surround the blade 6, as shown in FIG. 4, with the openings 38 engaged on the pegs 36. The screws 42 are tightened to abut the blade 6 and thus locate the second bracket 34 on the blade 6. A force is also exerted on the second bracket 34 pressing against the pegs 36 on the mulcher attachment to ensure that the blade is properly secured. It is desirable that the screws 42 be provided with gripping means, for example, projections on the underside of their heads, to facilitate the grip, bearing in mind the speed at which the blade rotates.

In the embodiment of FIG. 6 the mulcher attachment is formed with a flat area 44 corresponding to the flat central area 26 of the blade shown in FIG. 2. There are first flanges 46 formed at each edge of the area 44 of the mulcher attachment. First openings 48 are formed in the first flanges 46 and receive bolts 50. There is a generally U-shaped bracket 52 to abut the underside of blade central area 26. There are second flanges 54 in the generally U-shaped bracket 52 that abut the first flanges 48, the arrangement being shown most clearly in FIG. 7. Second openings 56 in the second flanges 54 align with the first openings 48 so that the mulcher attachment can be located by extending bolts 50 through the holes, through the openings and attaching nuts 58 to locate the mulcher attachment in position on the blade. Bolts 50 are desirably formed with a hardened locking lug 51 that digs into flange 54.

FIG. 8 also illustrates a distance piece 60 which can be used should the blade be below a predetermined width. Typically the central area 26 of the blade 6 will be 2 inches in width but blades in which the central area is 2¼ inches in width are known. The simple distance piece 60, about a quarter inch in width, can thus be used to take up the distance.

It is also desirable to provide a screw 62 with a sharp, hardened point. The screw 62 engage opening 64 in area 44 and abuts the blade to assist in location of the mulcher attachment.

FIGS. 9 to 11 show a safety arrangement to prevent the slight possibility of the attachment loosening and flying outwardly when in use. Bracket 52 is formed with a channel 70 formed with openings 72. A bar 74 is formed with tabs 76 which pass through openings 72 and are then bent to grip the outer surface of channel 70. These tabs thus act as a further means of locating the attachment located by bracket 52. The bar 74 is disirably provided with breakaway notches so that a single bar can be provided in all kits and broken to length by the user according to his requirements. One bar stretches between two brackets 52 on blade.

The present invention thus provides a simple attachment that provides economically the advantages of a mulcher lawnmower. The device is easy to make and can be sold relatively cheaply. Thus the relatively cheaper bagging lawnmowers, that is a lawnmower that normally must receive its cuttings in a bag, can be converted simply to a mulcher lawnmower, a type of lawnmower normally much more expensive than a bagging lawnmower. Furthermore on experiments conducted with a prototype of the attachment no clogging was apparent and wet grass could be cut quite easily, a task normally impossible with a conventional bagging lawnmower.

I claim:

1. In a rotary lawnmower comprising a motor, drive shaft extending from the motor, a cutting blade with cutting edges and trailing edges, attached to the drive shaft to rotate with the shaft to cut grass, a housing surrounding the blade, the improvement comprising a mulcher attachment free of a cutting edge and fastened generally parallel to the blade, above the blade, and shaped to provide deflectors to be spaced from the cutting portion of the blade, the deflectors comprising downwardly directed portions formed on the mulcher attachment adjacent and above the blade trailing edges, whereby cut grass from the blade is directed against the deflector portion and downwardly back in the grass as a mulch.

2. A mulcher attachment as claimed in claim 1 located on the drive shaft.

3. A mulcher attachment as claimed in claim 1 in which the attachment is located on the blade by fastening means cooperating with the blade and with the mulcher attachment.

4. A mulcher attachment as claimed in claim 3 in which the blade is formed with a flat central area;
   a corresponding central area on the mulcher attachment;
   first bracket means formed at an edge of the central area of the mulcher attachment to grip the central area of the blade;
   second bracket means adapted to be attached to the central area of the blade and to the central area of the mulcher attachment to locate the mulcher attachment on the blade.

5. A mulcher attachment as claimed in claim 4 including pegs formed on the central area of the mulcher attachment;
   openings in the second bracket means to receive and engage the pegs formed on the mulcher attachment;
   threaded openings in the second bracket means whereby threaded members can engage threaded openings to contact the blade and hold the mulcher attachment in position.

6. A mulcher attachment as claimed in claim 3 in which the blade is formed with a flat central area;
   a corresponding flat central area on the mulcher attachment;

first flanges formed at each edge of the central area of the mulcher attachment;

first openings in the first flanges to receive bolts;

a generally U-shaped bracket to abut the blade central area;

second flanges in the generally U-shaped bracket to abut the first flanges;

second openings in the second flanges to align with the first openings;

whereby the mulcher attachment can be placed in contact with one surface of the central area of the blade and the generally U-shaped bracket placed in contact with the other surface of the central area of the blade, bolts extending through the first and second openings locating the mulcher attachment in position on the blade.

7. A mulcher attachment as claimed in claim 6 including a distance piece to abut an edge of the blade and extend to contact the second flange if the blade central area is below a predetermined width.

* * * * *